Patented Mar. 26, 1935

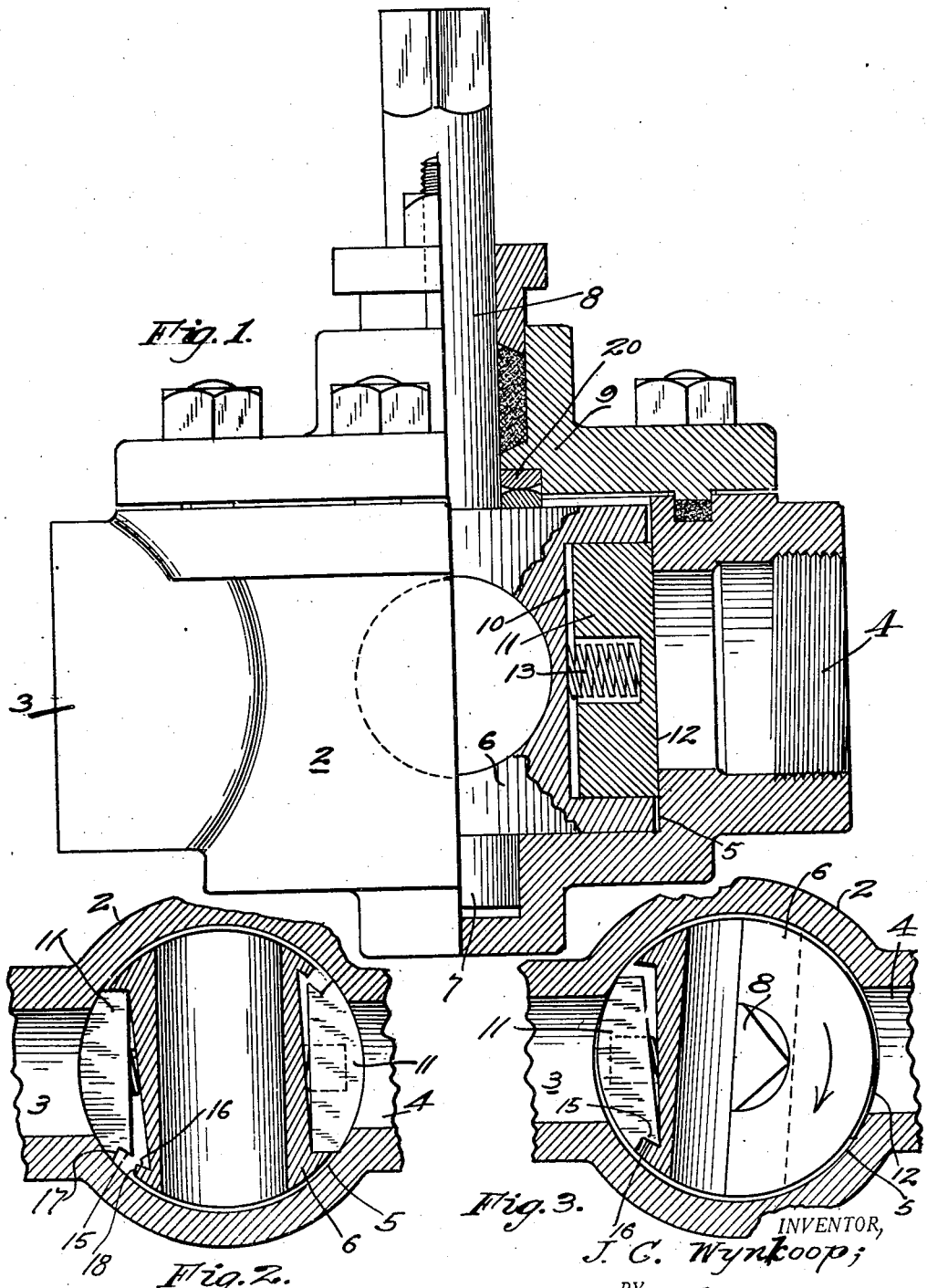

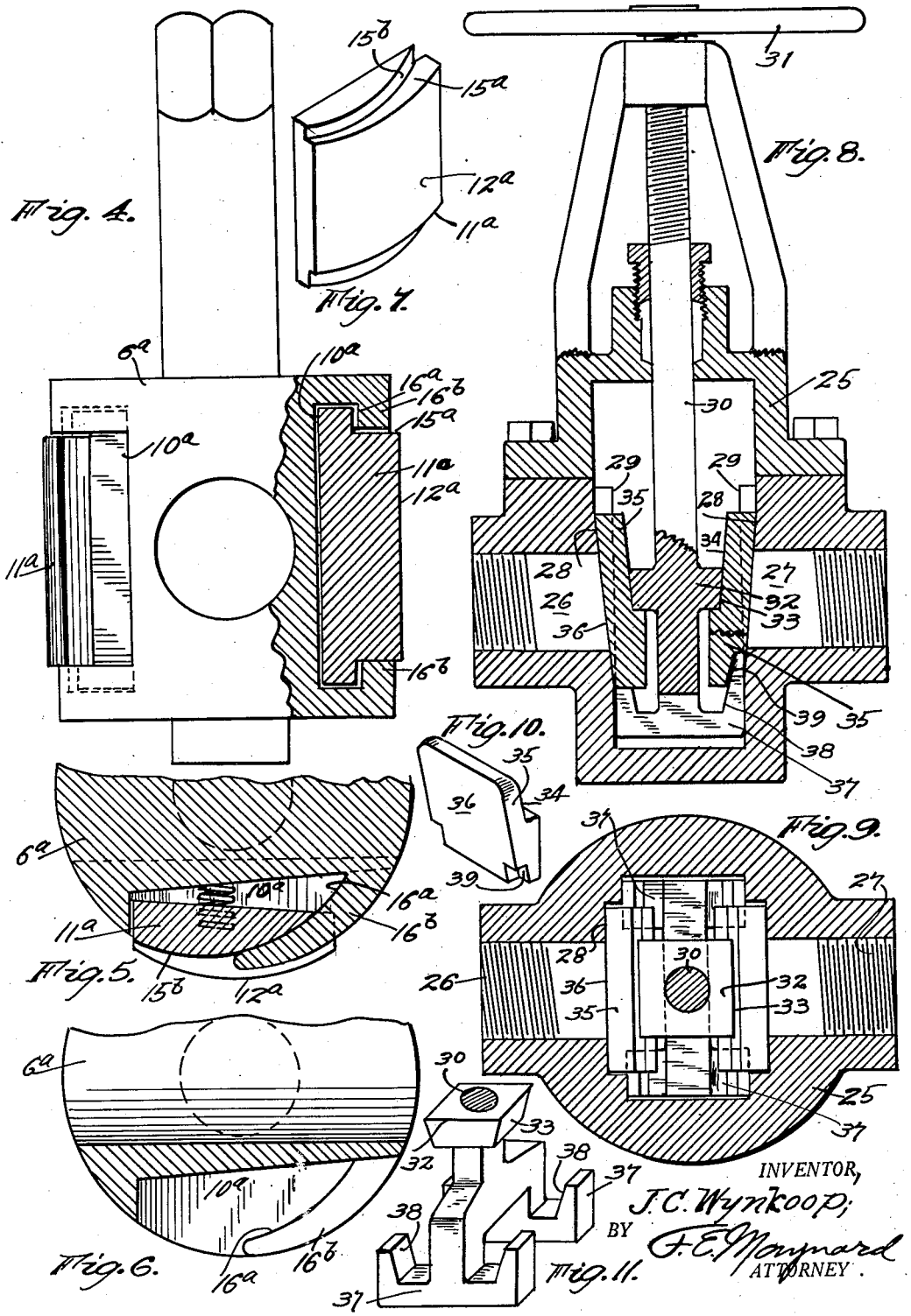

1,995,491

UNITED STATES PATENT OFFICE 1,995,491

RELIEF-ACTION VALVE

Jesse C. Wynkoop, Whittier, Calif.

Application July 22, 1933, Serial No. 681,722

4 Claims. (Cl. 251—102)

This invention relates to fluid control valves and more especially to high pressure liquid control valves, for pipe lines, of the rotary plug type; though it is to be understood that the novel features are not so necessarily limited.

It is an object to provide means whereby an initial action of an element of the valve is effective to secure a great reduction in the area of contact of the closure members of the valve and thereby reduce the friction of motion and enable the use of much less energy to open the valve against line pressure than is common in the class of valves here concerned.

The invention is shown as embodied in a "stopcock" type valve in which the shell has a wall with inlet and outlet ports which are closed by closure members which are movably mounted in cages forming parts of a rotative plug or core; one position of which places the closures over the ports to close them, while in another position the core moves the closures to uncover the ports or "clear" them for free flow of fluid.

A feature of this invention is that the "core" is provided with means to so tilt or lift the closure members (hereinafter called the "closure") as to greatly reduce their area of contact on their seats during the movement which clears the closures from their ports. It might be said that the closures are initially opened a crack and then shifted bodily to fully clear; the shifting being done while the closures are tilted with one end resting on the valve seats.

The invention consists in certain advancements in this art as set forth in the ensuing disclosure and having, with the above additional objects and advantages as hereinafter developed, and whose construction, combination and details of means, and the manner of operation will be made manifest in the description of herewith illustrative embodiment; it being understood that modifications, variations and adaptations may be resorted to within the scope, principle and spirit of the invention as it is more directly claimed hereinafter.

Figure 1 is an axial section of one form of valve;

Figure 2 is a cross-section of the fully closed valve, and

Figure 3 is a similar section showing the plug partly in plan and showing one of the closures in tilted or "cracked" position.

Figures 4, 5, 6 and 7 are detail views of a modified form of the valve with double end wedge lifts.

Figures 8, 9, 10 and 11 are sectional and detail views of a form with an axial slide action.

In this embodiment a shell 2 has tapped ports 3 and 4 (inlet and outlet) in its wall and these are formed in a finished seat surface or bore 5, forming a chamber in which is rotative an unseated plug or core 6; that is, the core does not fit the bore seat but has a bottom trunnion 7 journaled in the shell bottom and has a stem 8 sealed in the gland-packed head 9 of the shell.

The core 6 is essentially a carrier having one or more side cages or pockets 10 movable into register with the valve ports and carrying blocks 11 relatively movable in their cages and having closing faces 12 fitting the bore face 5.

The blocks or closures 11 are designed to fully cover the respective ports 3—4 and are bodily shiftable endwise to "clear" the ports for free flow of fluid. The closures 11 are provided with expansion springs 13, in their cages, which normally press the closures to their wall seats 5 but provide for a recessional movement of the closures into their cages as is desirable in order to reduce the area of contact of each valve closure on its seat, particularly during the preliminary portion of the opening movement when, if the valve is subjected to more than the ordinary pipe line pressure (this being about 100 pounds per square inch), the load resistance becomes appreciable and even heavy at line pressures going from 150 pounds upward; thousand pound pressures being not uncommon in the oil fields. And, of course, the larger the valve port area the greater the proportionate load; even at the lower range of pressures.

Hence this valve is provided with means to positively crack or slightly open the closure even before it has started its clearing shift from the port. The cracking movement is prior to and followed by the clearing or opening movement.

The cracking means is here shown as including an angular facet 15 provided along a side of each closure 11 and complementary to a cooperative facet 16 provided along an adjacent face of the cage side; the relation of the facets 15—16 to the body of the closure 11 being such that the facet 16 acts as a wedge to pry up the closure when, upon right-hand direction of the carrying core 6, the effective wedge facet 16 engages the closure facet 15.

The cage space is sufficiently wider than the closure 11 to permit this preliminary core movement and cracking of the closure by the wedge facet 16 prior to positive engagement of the core, as by shoulder 17 with shoulder 18 of the relative closure, to effect an endwise shift of the closure from, and to clear, its port (3—4).

It will be seen, Figure 3, that the effect of the wedge action is to tilt up one end of a closure 11, while it is subjected to pressure, the opposite end being pressed against the seating surface as the master part or carrying core 6 is actuated; in this case rotated in right-hand direction until the port is fully uncovered.

When the valve is to be closed the core 6 is turned left-hand and since the closures are free of dead load, or static pressure, they are easily moved to shut-off position.

If desired, end-thrust on the core can be taken on anti-friction bearings 20, of any type, surrounding the stem 8.

In Figs. 4, 5, 6 and 7 the valve consists of a rotative carrying core 6ª having side pockets 10ª in which are segmental blocks 11ª relatively movable in their pockets and having closing faces 12ª fitting the bore face of a respective shell, as shell 2. In this form each block 11ª has top and bottom corner recesses 15ª with elongated eccentric or cam faces 15ᵇ matching with internal lift faces 16ª provided on top and bottom hook ledges 16ᵇ at the mouth of the pockets. The divergence of the lift faces 16ª as to the shell bore is such that, as clearly shown in horizontal section, Fig. 5, when the core is turned to the right the hook will pass wedge fashion against the cam face 15ᵇ and tip up the near end of the block a crack and break the load pressure which seats the block across the shell port. Following the pressure relief, the valve parts all turn as a unit and fully uncover the ports. The block 11ª is clearly shown in perspective in Fig. 7, and Figs. 5 and 6 are sectional views of the valve core pocket respectively with and without the block.

The same principle of cam lift in a slide or gate valve is shown in Fig. 8 which is an axial section thereof. The shell 25 has opposite ports 26—27 ending in upwardly divergent internal, gate seat faces 28 at the sides of which are parallel face guideways 29 on which run a foot device on the lower end of a stem 30 whose upper end is threaded of engagement with a nut wheel 31 operating to raise or lower the stem. The stem has a block 32 with opposite wedge faces 33 engaging complementary back faces 34 of a set of closure gates 35 whose outer faces 36 incline in accordance with the seats 28 so that when the stem is run down the wedge block 32 will jam the gates closed. In order to facilitate opening of the gates by reducing their area of frictional contact the foot device of the stem 30 is provided with a set of pairs of hooks 37, whose outer faces slide on the guideways 29, having inner divergent wedge facets 38 which engage complementary facets 39 in recessed outer corners of the lower ends of the pair of gates 35. When the gates are closed the initial upward movement of the hooks 37 engages them with the gates as these are freed from the block 32 and the lower ends of the gates are opened a crack and then the gates bodily shifted upward to uncover the ports. The shell 25 is shown in cross-section in Fig. 9, with the gates, in plan, closed. Fig. 11 shows the gate hook device in perspective, and a gate 35 is shown in perspective in Fig. 10.

What is claimed is:

1. In a valve of the class described, a ported shell having a valve chamber, a core turning clear in the chamber, a port closure slidably mounted in the core for free radial movement relative thereto and closable by fluid pressure in the chamber to stop fluid flow, and said core and said closure having normally separated hooks with mutually acting wedge faces whereby when the wedge of the core turns into engagement with that of the closure, the closure is forced inwardly into the core to open the valve port against the fluid pressure in the valve.

2. In a high pressure cock of the class described, a turnable core body recessed laterally to form a pocket one side wall of which is provided with spaced hooks, and a closure member lying in said pocket and free to move radially as to the core, one side of the closure having cam faces which are engageable with contiguous like faces of the said hooks; said faces being inclined as to a radius therethrough from the center of rotation so that the closure is forced inward into the core pocket against fluid pressure in the cock.

3. A cock of the kind set forth in claim 2 and in which the wedge cam faces of the closure face outwardly toward its seat.

4. A valve of the class described, having, in combination, a shell with a ported, circular bore, a core turning in the bore and clear of its surface, and a closure disposed in a recess in the core and having a bore seating face; said core having under-cut wedge hooks at one side of its recess and said closure having complementary, wedge faces on its bore seating side; whereby when the core wedges move against the wedges of the seated closure the latter is pried radially inward against fluid pressure in the valve.

JESSE C. WYNKOOP.